F. L. KANE.
Fire-Proof Roofs and Floors.

No. 199,210. Patented Jan. 15, 1878.

UNITED STATES PATENT OFFICE.

FREDRICK L. KANE, OF BROOKLYN, ASSIGNOR TO WARREN CHEMICAL AND MANUFACTURING COMPANY, OF NEW YORK, N. Y.

IMPROVEMENT IN FIRE-PROOF ROOFS AND FLOORS.

Specification forming part of Letters Patent No. 199,210, dated January 15, 1878; application filed April 28, 1877.

*To all whom it may concern:*

Be it known that I, FREDRICK L. KANE, of Brooklyn, in the county of Kings and State of New York, have invented a new and useful Improvement in Roofs and Floors, which is fully set forth in the following specification and accompanying drawings.

Figure 1:
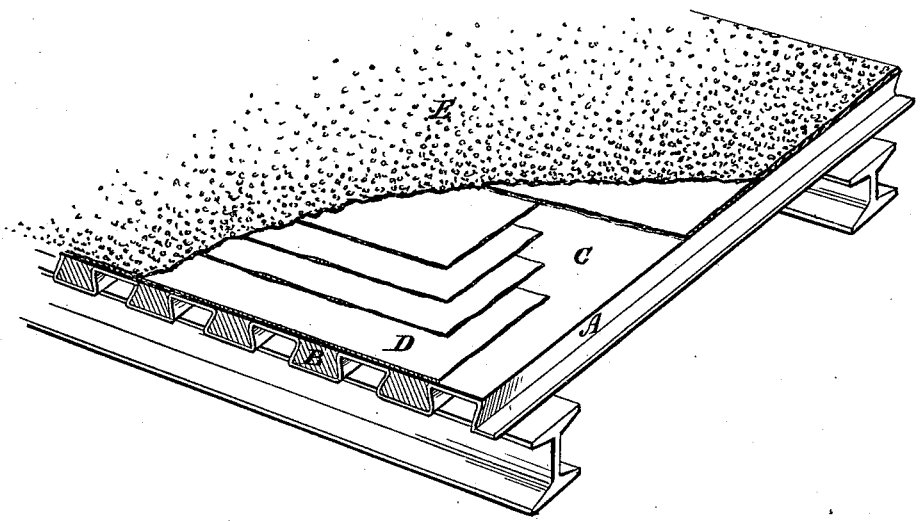
Figure 2:

Figure 1 is a perspective view, and Fig. 2 a sectional view.

This invention relates to that class of fire and water proof roofs and floors constructed of light iron beams or rafters and corrugated or grooved iron lath or sheathing covered with water-proof cement, for a more particular description of which reference is made to the patent of John B. Cornell, No. 139,945, dated June 17, 1873.

On the score of economy this class of roofing and flooring possesses great advantage over the heavy iron beams and brick arches commonly used in strictly fire-proof buildings; but hitherto the water-proof cement has been applied directly to the surface of the corrugated metal lath or sheathing; and when such cement is made of sufficient hardness to walk upon in the heat of summer, and is thus applied, it is liable to crack from contraction when exposed to extreme cold, and then to leak.

The object of my invention is to obviate the liability to crack and leak; and it consists in adding to the combination heretofore used in this class of roofing and flooring a covering of paper, felt, or cloth saturated or coated with any of the well-known materials used in the manufacture of cement, composition, or gravel roofing, such as oil, mineral or wood tar or pitch, asphaltum, rosin, or a mixture of one or more of these.

In the drawings, A A is the grooved iron lath or sheathing. B B is the mortar or concrete filled in the grooves. C C is the thin layer of tarry or pitchy cement. D D is the paper, felt, or cloth coated with tarry or pitchy cement. E E is the outer covering of gravel, broken stone, or mastic concrete.

In covering these roofs or floors, to make them permanently water-proof, I even up, and, if desired, coat all over, the surface of the corrugated or grooved iron to any desired thickness with a tarry or pitchy concrete of mastic, or with hydraulic or lime mortar or concrete, or other suitable material in lieu thereof, to make a firm, even surface to support the paper, felt, or cloth, and at the same time render the roof more fire-proof. When sufficiently set upon the surface of the mortar, concrete, or mechanical equivalent, I spread a thin coating of any suitable tarry or pitchy roofing cement, (preferably an asphaltic cement or pitch,) to stick down the saturated or coated paper, felt, or cloth, which is applied in any desired number of layers, after the manner common in roofing with this class of fabric. I prefer to stick these layers together with the tarry or pitchy cement between the sheets; but it is not essential to do so. Upon the saturated or coated paper, felt, or cloth thus laid I spread a coating of tarry or pitchy roofing cement, (preferably an asphaltic cement or pitch,) into which gravel, broken stone, or sand is embedded to form the outer surface. Or the saturated or coated paper, felt, or cloth, laid as hereinbefore described, may, instead of being covered with tarry or pitchy cement and gravel, broken stone, or sand, be covered with any kind of mastic suitable for roofing.

I make no claim upon the corrugated or grooved iron lath or sheathing, nor upon the combination of corrugated grooved iron sheets with iron beams and fire and water proof cement, nor upon any of the materials used in my combination.

Having thus described my invention, what I claim as new, and desire to secure by Letters Patent, is—

A roof or floor composed of corrugated iron sheathing covered by a coating of mortar or concrete, (or other analogous material,) in combination with a covering or layers of paper, felt, or cloth, saturated or coated with oily, tarry, or pitchy material, in the manner and for the purpose herein described.

FRED. L. KANE.

Witnesses:
D. WALLIS MORRISON,
J. H. HUME.